(12) United States Patent
Georgiev

(10) Patent No.: US 8,560,305 B1
(45) Date of Patent: Oct. 15, 2013

(54) LOGIFOLG

(76) Inventor: Hristo Georgiev, Walenstadt (CH)

( * ) Notice: Subject to any disclaimer, the term of this patent is extended or adjusted under 35 U.S.C. 154(b) by 72 days.

(21) Appl. No.: 13/472,496

(22) Filed: May 16, 2012

(51) Int. Cl.
*G06F 17/27* (2006.01)
*G06N 5/02* (2006.01)

(52) U.S. Cl.
USPC ............................................. 704/209; 706/47

(58) Field of Classification Search
None
See application file for complete search history.

(56) References Cited

U.S. PATENT DOCUMENTS

| RE39,302 | E  * | 9/2006  | Lanier et al. | 706/58 |
|----------|------|---------|---------------|--------|
| 7,313,515 | B2 * | 12/2007 | Crouch et al. | 704/9  |
| 7,447,667 | B2 * | 11/2008 | Gong et al.   | 706/47 |
| 7,725,321 | B2 * | 5/2010  | Bennett       | 704/257 |
| 7,844,562 | B2 * | 11/2010 | Gong et al.   | 706/47 |
| 2007/0299802 | A1 * | 12/2007 | Kwok        | 706/52 |
| 2009/0327811 | A1 * | 12/2009 | Hofford     | 714/26 |

* cited by examiner

*Primary Examiner* — Talivaldis Ivars Smits

(57) ABSTRACT

LOGIFOLG is a system and method for finding implicit information that is not explicitly mentioned in the sentence, not contained in the synonyms of the particular word, not present in the concept the word belongs to, not found with statistical or concordance based analysis. Nevertheless, this implicit information is present and understood, implicitly, consciously or unconsciously, by everybody who reads the text. LOGIFOLG uses a computer software process, such as computer-executable program code, to discover this implicit information. The steps in this process are: analyzing user's written input, up to five successive and non-successive words in a sequence, understanding the meaning of the written input, finding implicit information in the written input and finally, displaying the implicit information as a variant of the original sentence. The subject matter of the invention deals with Artificial Reasoning, namely inductive and deductive reasoning, based on Natural Language written sentences. The medium is non-transitory.

3 Claims, No Drawings

LOGIFOLG

TECHNICAL FIELD

Natural Language Text Processing, Artificial Intelligence, Robotics.

DESCRIPTION OF THE INVENTION

Inferences are made when a human being or computer software process finds unavailable information in Natural Language sentences. Our intelligent computer-executable program has an inductive and deductive automated reasoning. It can find and display implicit information, that is not explicitly mentioned in the text, not contained in the synonyms of the particular word, or present in the concept the word belongs to. No statistical analysis or concordance based analysis can detect this information. Nevertheless, this implicit information is present and understood, implicitly, consciously or unconsciously, by everybody who reads the text. The inductive reasoning of our computer-executable program is based to a great extent on its deductive reasoning, present in the word classes by default. The basic principle of the deductive reasoning is that if something is true of a class of things in general, this truth applies to all members of that class.

Therefore, we do not have difficulties to teach our program that all living beings, including all humans, are mortal or that all birds can fly. If we list, in our database, all humans, who have lived 2500 years ago, including Socrates and Agamemnon, our computer-executable program will be able to deduce that Socrates and Agamemnon are long dead, since no human being can live that long. We need a simple rule in the program to do that, if we have this information in our database.

Our computer-executable program is capable of finding implicit information in simple sentences, also in complex, compound sentences. The understanding of the meaning of the sentence is based upon successive and non-successive words, up to five in a sequence, within the sentence or the clause. For example if we type in "John shot a partridge", the program will print out "John is a hunter", because partridge is a wild game bird, if one types in "John slaughters chicken", the program will print out "John is a butcher", because chicken are domestic poultry, if one types in "John killed Susan", the program will print out "John is a murderer", "Susan is dead". If we type in "John married Ann", the program will print out "John is husband of Ann", "Ann is wife of John", etc.

One can substitute the names John, Ann, etc, with any other name (contained in our database) or with any human being, male or female (man, woman, priest, president, etc.). Also, one can substitute partridge with any other wild game or chicken with any other domestic animal to achieve the same result. Besides, our computer-executable program can turn the sentence and preserve its meaning, for example, if we type in "John is smaller than Ali.", the program will display "Ali is bigger than John", if we type in "Alexander breeds pigs", the program will display "The pigs are bred by Alexander", etc.

Languages: English and German. With the same method, one can develop similar software programs for other languages. Runs on all versions of Windows, also on Windows 7 and Windows 64 Bit.

Only non-transitory computer-readable media are within the scope of the application.

PROBLEM SOLVED BY THE INVENTION AND SOLUTION TO THIS PROBLEM

There are many problems that can be solved with this invention. The discovery of the implicit information contained in the sentence or in the text will help the search engines find more accurately the information we are looking for. Finding the right information contained in a huge database in shortest possible time is the main problem faced by all search engines. LOGIFOLG helps to solve exactly this problem, by providing additional information contained in the text, information not written in words or present in the synonyms and in the concepts of the existing words. A computer-executable program, capable of artificial reasoning can find applications in many other technical areas where independent and reliable decision making, based on written information, is required. For example, in the artificial brains of robots to enable them take independent decisions in a constantly changing environment, where independent reasoning, based on logical inferences upon the information gathered, will trigger the right decision at the right moment.

DETAILED DESCRIPTION OF EMBODIMENTS OF THE INVENTION

The programming language used in the invention is C/C++.
The morphology of the word is described in a *.cpp file as follows
   if (morsyn=G_SYN)
//if, morphologically, this is a participle

```
    if (morsyn == G_SYN
// if, morphologically, this is a participle
        {
        if (subflx == 2 && dicsyn != V_SYN && dicsyn != ZSYN &&
        dicsyn != _D_SYN && dicsyn != A_SYN &&
            dicsyn != _E_SYN && dicsyn != _V_SYN)
// if, morphologically, this is a participle, ending in -ing and it is not
// ambiguous, not registered in the database as an adverb or an adjective
            {
            wrd->syn = (uchar)dicsyn;
// then it is, as registered in the database
            }
        else
            wrd->syn = ASYN;
// if not, then it is an adjective
            }
        // etc. for all parts of speech
    and in an *.h file, as follows
struct MORPH FLEX en_endflexn[ ] =
{
"est",              "d2",         NULL, 3,
"al",               "d2",         NULL, 2,
"ally",             "d2",         NULL, 4,
"ly",       "D",    NULL, 2,
"d",        "V",    NULL, 1,
"s",        "V",    NULL, 1,
"d",                "E",          NULL, 1,
"ed",               "E",          NULL, 2,
"s",                "n",          NULL, 1,
// etc.
NULL
};
// where est, ally, ed, s, etc. are word endings, typical for a particular
// part of speech (verb, adverb, past participle, noun plural, etc.)
```

The syntax (Part of Speech, sometimes, Part of the Sentence of the word or phrase) is described in a *.cpp file as follows

```
        case 3:
            if (strrchr(wrdm->cw, N_SYN)) {
                wrdm->syn = N_SYN;
// if the last word in this sequence is registered in the database as ambiguous
```

-continued

```
// (noun or verb), then it is a noun, if preceded by a verb
           }
           CopySyn( );
           i = mpos; continue;
// and in the respective *.h file, as follows:
{ "[Veu]<dkKD>V", NULL, 3},
       case 4:
       for (x = i; x < mpos && wp[x]->syn != _D_SYN; x++);
       if ((wp[x]->S.B.time && (wrdm->S.B.time || wrdm->esyn ==
       I_SYN) && wp[x]->E.W.noun) || (wp[x]->E.W.noun && !wp[x]->
       E.W.beforen) )
// if the word, as defined, meets the above conditions, it is a noun
           wp[x]->syn = N_SYN;
           else
                wp[x]->syn = A_SYN;
// else, it is an adjective
           CopySyn( );
           i = mpos; continue;
// and in the respective *.h file, as follows:
       {"[TO]d~-",   NULL, 4},    /* the well (N) */
       {"dN",       NULL, 4},    /* early sixties */
       {"[PV]d[ZG]", NULL, 4),
       case 32:
       if (wrdp->E.W.adj && !wrdp->numb)
           {
           wrdp->syn = ASYN;
              CopySyn( );
           }
           i = mpos; continue;
   // and in an *.h file, as follows
       {"A[C]<KD>[ZN][;)}JPB*]", NULL, 32},
// we define individual words and parts of speech as follows
   {"'pendingT", "P", },
// pending, before an article, is a preposition
// etc.
```

The meaning, the semantic component of the word or phrase, is described in a *.cpp file as follows

```
   case 'q':
       G->W.illness = 1;
       break;
// semantic code for the concept illness, including all kinds of illnesses
   case 'Ÿ':
       G->W.hit = 1;
       break;
// semantic code for the concept hit(ting), including all synonyms of hit
   case '½':
       G->W.writing = 1;
       break;
// semantic code for the concept write (writing), including all synonyms
// etc.
```

In an *.inl file we declare the same meanings once again, as follows
if (g->Willness) *c++ = 'q';
if (g->W.hit) *c++ = 'Ÿ';
if (g->W.writing) *c++ = '½';
// etc.
In one *.h file we declare the meaning a word or phrase can have
unsigned illness   : 1;
unsigned hit       : 1;
unsigned writing   : 1;
// etc.

We declare the meaning once again in another *.h file

| | |
|---|---|
| uchar | illness; |
| uchar | hit; |
| uchar | writing; |
| // etc. | |

We declare the Part of Speech and the meaning in the database, as follows
jaundice*N[q]jaundice
hit*e[ifl]hitNhitCcrashLhitFhit
newspaper*N[¢]newspaper
john*N[NHM]john
//etc.
where
N is an abbreviation for Noun
e is an abbreviation for Verb (Present or Past or Participle) or Noun
In square brackets [ ]
q is an abbreviation for illness
f is an abbreviation of a concept, comprising a number of synonyms denoting "hit"
H is an abbreviation for a human being, a person.

Without correct morphological, grammatical, syntactical and semantical analysis, the software program cannot make logical inferences, because it will not recognize the grammatical, syntactical and semantical role of the words in the sentence.

The method, upon which the software program makes logical inferences, is not published. It is a trade secret. We will describe it briefly below.

And, finally, when we have laid the foundations of our morphological, syntactical and semantical analysis, we can start writing our commands, when and what should be done in order to make logical inferences, in another *.cpp file, as follows

```
case 112: // change position of the Noun, preserve the meaning
       if (wrd->E.W.name == 1 && wrdm->E.W.name = 1 &&
   wrdp->E.W.kill_er == 1) {
               printf("\%s\ ", wrdm->inword);
               printf("was killed ");
           printf("by ");
           printf("\%s\n", wrd->inword);
           }
// where wrd, wrdm, are word positions in the sentence;
// E.W.name, E.W.kill_er, etc. are semantic codes for concepts.
// the same applies for all codes listed below
           if (wrd->E.W.name != 1 && wrdm->E.W.name != 1 &&
   wrd->next->E.W.kill_er == 1 && !wrdm->numb) {
           printf("The ");
               printf("\%s\ ", wrdm->inword);
               printf("was killed ");
```

```
                printf("by the ");
                printf("\%s\.\n", wrd->inword);
            }
            if (wrd->E.W.name != 1 && wrdm->E.W.name != 1 &&
wrd->next->E.W.seeing == 1 && wrdm->numb) {
    printf("The ");
                printf("\%s\ ", wrdm->inword);
                printf("were seen ");
    printf("by the ");
                printf("\%s\.\n", wrd->inword);
            }
            if (wrd->E.W.name != 1 && wrdm->E.W.name != 1 &&
wrd->next->E.W.say == 1 && !wrdm->numb) {
    printf("The ");
                printf("\%s\ ", wrdm->inword);
                printf("was accosted ");
    printf("by the ");
                printf("\%s\.\n", wrd->inword);
            }
            if (wrd->E.W.name == 1 && wrdm->E.W.name != 1 &&
!wrdm->numb && wrd->next->E.W.attack == 1) {
    printf("The ");
                printf("\%s\ ", wrdm->inword);
                printf("was attacked ");
    printf("by ");
                printf("\%s\.\n", wrd->inword);
            }
            if (wrd->E.W.name != 1 && wrd->next->E.W.eat == 1 &&
!wrdm->numb &&
                (wrdm->E.W.food == 1 || wrdm->E.W.fmit == 1)) {
        printf("The ");
                printf("\%s\ ", wrdm->inword);
                printf("was eaten ");
        printf("by the ");
                printf("\%s\.\n", wrd->inword);
            }
// or make a conclusion, below
            if (wrdm->E.W.drug == 1 && wrd->E.W.human == 1 && wrd->numb
== 0 && wrdm->E.W.negative != 1 &&
                (wrd->next->E.W.take == 1 || wrd->next->E.W.eat == 1 ||
wrd->next->E.W.drink == 1)) {
    printf("\%s\ is ill.\n", wrd->inword);
            }
            if (wrdm->E.W.country == 1 && wrd->E.W.country == 1 &&
                (wrd->next->E.W.take == 1 || wrd->next->E.W.attack == 1)) {
    printf("\%s\ is an aggressor.\n", wrd->inword);
            }
// etc., etc.
        i = mpos; continue;
// In an *.h file we describe the word relationships for the above rule as follows:
    {"N[VEue]<TA>N",    NULL,112},
// where N, V, T, A, etc., are codes for parts of speech in a defined sequence of words within
// the sentence.
        case 113:
            if (wrd->E.W.human == 1) {
            if (!stricmp(wrdm->inword, "job") ||
!stricmp(wrdm->inword, "work")) {
                printf("\%s\ is unemployed.\n", wrdm->inword);
                    printf("\%s\ is on the dole.\n", wrdm->inword);
                }
                if (!stricmp(wrdm->inword, "parents")) {
                printf("\%s\ is an orphan.\n", wrdm->inword);
                }
            }
        i = mpos; continue;
// In an *.h file we describe the word relationships for the above rule as follows:
    {"N'hasn't'<T>N",    NULL,113},
    {"N'hasn't''got'<T>N",    NULL,113},
    {"N'has no'N",    NULL,113},
// where N, A, etc. are codes for parts of speech in a defined sequence of words within the
// sentence; hasn't, has no, etc. are actual words used in this context.
        case 123:
            if (wrdp->E.W.increase == 1 && !stricmp(wrdm->inword, "in value")) {
        printf("\%s\ is a good investment.\n", wrdm->inword);
            }
                CopySyn( );
                i = mpos; continue;
// In an *.h file we describe the word relationships for the above rule as follows:
    {"[NR]<xY>[EVeu][DAd]",    NULL,123},
```

```
-continued

// where in value is contained in [DAd] as a phrase
        case 125:    // 2012
    if (wrd->E.W.human == 1 && wrdp->E.W.payment == 1 &&
wrdm->E.W.money == 1) {
   printf("\%s\ deals with money.\n", wrd->inword);
   }
        if (wrd->E.W.human == 1 && wrdp->E.W.say == 1 && wrdm->E.W.human
== 1 && !wrdm->E.W.nationality) {
         printf("\%s\ and ", wrd->inword);
   printf("\%s\ ", wrdm->inword);
   printf("are interlocutors. \n");
   }
        if (wrd->E.W.human == 1 && wrdp->E.W.gather == 1 &&
wrdm->E.W.human != 1) {
         if (wrd->numb == 1) {
           printf("\%s\ ", wrd->inword);
   printf("have a collection of ");
   printf("\%A. \n", wrdm->inword);
         }
         if (wrd->numb != 1) {
           printf("\%s\ ", wrd->inword);
   printf("has a collection of ");
   printf("\%s\. \n", wrdm->inword);
         }
   }
        if (wrd->E.W.human == 1 && wrdm->E.W.human == 1 &&
(!stricmp(wrdp->inword, "visit") ||
         !stricmp(wrdp->inword, "visited") || !stricmp(wrdp->inword, "visits") ||
         !stricmp(wrdp->inword, "went to see") ||
!stricmp(wrdp->inword, "went to see her") ||
   !stricmp(wrdp->inword, "went to see his") ||
         !stricmp(wrdp->inword, "pay a call") ||
!stricmp(wrdp->inword, "pays a call") ||
         !stricmp(wrdp->inword, "paid a call") ||
!stricmp(wrdp->inword, "pay a visit") ||
         !stricmp(wrdp->inword, "pays a visit") ||
!stricmp(wrdp->inword, "paid a visit"))) {
         printf("\%s\ is a guest.\n", wrd->inword);
   printf("\%s\ is a host.\n", wrdm->inword);
   }
        CopySyn( );
        i = mpos; continue;
// In an *.h file we describe the word relationships for the above rule as follows:
   {"[NR ][VEeu]<P>[NAG]",    NULL,125},
// where N, V, T, A, etc.are codes for parts of speech in a defined sequence of words within
// the sentence.
        case 126:
   if (wrd->E.W.human == 1 && (wrdm->E.W.human == 1 &&
wrdm->E.W.science == 1)) {
    printf("\%s\ is university graduate.\n", wrd->inword);
   }
        if (wrd->E.W.human == 1 && wrd->E.W.fgender == 1 &&
wrdm->E.W.human == 1 && wrdm->E.W.mgender == 1
         && !stricmp(wrdp->inword, "is the wife of")) {
    printf("\%s\ is the husband of ", wrd->inword);
   printf("\%s\.\n", wrdm->inword);
   }
        if (wrd->E.W.human == 1 && wrd->E.W.mgender == 1 &&
wrdm->E.W.human == 1 && wrdm->E.W.fgender == 1
         && !stricmp(wrdp->inword, "is the husband of")) {
    printf("\%s\ is the wife of ", wrd->inword);
   printf("\%s\.\n", wrdm->inword);
   }
        CopySyn( );
        i = mpos; continue;
// In an *.h file we describe the word relationships for the above rule as follows:
   {"[NR]<XTA>[NAG]",    NULL,126 },
// etc., etc.
   case 199:
     if (wrd->E.W.human == 1 && wrd->E.W.mgender == 1){
         if ((wrdm->E.W.human == 1 && wrdm->E.W.fgender == 1) &&
           (!stricmp(wrdp->inword, "married") ||
!stricmp(wrdp->inword, "is married to"))){
           printf("\%s\ is the husband of ", wrd->inword);
   printf("\%s\.\n", wrdm->inword);
   printf("\%s\ is the wife of ", wrdm->inword);
   printf("\%s\.\n", wrd->inword);
         }
   }
        if (wrd->E.W.human == 1 && wrdm->E.W.human == 1){
```

-continued

```
        if ((wrd->E.W.mgender == 1 && wrdm->E.W.mgender == 1) &&
            (!stricmp(wrdp->inword, "married") ||
!stricmp(wrdp->inword, "is married to"))){
            printf("\%s\ and ", wrd->inword);
            printf("\%s\ are homosexuals.\n", wrdm->inword);
            }
        }
        if (wrd->E.W.human == 1 && wrdm->E.W.human == 1){
            if ((wrd->E.W.fgender == 1 && wrdm->E.W.fgender == 1) &&
                (!stricmp(wrdp->inword, "married") ||
!stricmp(wrdp->inword, "is married to"))){
                printf("\%s\ and ", wrd->inword);
                printf("\%s\ are lesbians.\n", wrdm->inword);
            }
        }
        if (wrd->E.W.human == 1 && wrd->E.W.fgender == 1){
            if ((wrdm->E.W.human == 1 && wrdm->E.W.mgender == 1) &&
                (!stricmp(wrdp->inword, "married") ||
!stricmp(wrdp->inword, "is married to"))){
                printf("\%s\ is the wife of ", wrd->inword);
                printf("\%s\.\n", wrdm->inword);
                printf("\%s\ is the husband of ", wrdm->inword);
                printf("\%s\.\n", wrd->inword);
            }
        }
        if (wrd->E.W.human == 1 && wrdm->E.W.human == 1 &&
            !stricmp(wrdp->inword, "was married to")){
            printf("\%s\ and ", wrd->inword);
        printf("\%s\ are divorced.\n", wrdm->inword);
        }
        i = mpos; continue;
// In an *.h file we describe the word relationships for the above rule as follows:
    {"[NR][vzVEh]<DdA>N",    NULL, 199},
// where N, V, T, A, etc.are codes for parts of speech in a defined sequence of words within
// the sentence.
// etc., etc.
```

As a result of the instructions above and all other instructions in the program, which we have not listed, such sentences as
Ann and Ali married.
will output the logical conclusion
Ann is the wife of Ali.
The sentence
Ann and Susan married.
will output the logical conclusion
Ann and Susan are lesbians.
The sentence
John killed Ann.
will output the logical conclusion
Ann was killed by John.
John is a murder.
Ann is a victim.
Ann is dead.
The sentence
Ali eats a cake.
will output the logical conclusion
The cake was eaten by Ali.
Ali is hungry.
The sentence
Pretty is a synonym to beautiful.
will output the logical conclusion
Beautiful is a synonym to pretty.
The sentence
London is as big as Paris.
will output the logical conclusions
Paris is as big as London.
Paris and London are the same big.
etc. examples, covering hundreds of syntactic structures and many millions of simple and compound (complex) sentences.

BACKGROUND OF THE INVENTION

Field of the Invention

The present invention relates to a Natural Language Text Processing System able to process, to parse (to analyse)
morphologically the input word entries,
syntactically and grammatically the input phrases and sentences,
semantically, the input words, phrases and sentences.
Logical conclusions cannot be made without accurate parsing of the input sentence or text. The parsing itself is a complex process, involving other interdependent processes, such as morphological, grammatical, syntactical and semantical analysis of the sentence or the entire text.

SUMMARY OF THE INVENTION

The subject matter of the invention deals with Automated Reasoning, namely inductive and deductive artificial reasoning, based on Natural Language written sentences. Using Natural Language Text Processing techniques, the meaning of a written sentence is understood, paraphrased, if needed, and the implicit information found in the sentence is displayed. This implicit information interprets additionally in detail and depth the meaning of the original source sentence.
No statistical analysis or concordance based analysis can detect the additional, implicit information, contained in the sentence, because this information is not present in the synonyms of the particular word, or part of the concept the word belongs to. Nevertheless, this implicit information is present and understood, implicitly, consciously or unconsciously, by everybody who reads the text. analysing the user's written input, understanding the meaning of the written input, finding implicit information in the written input and finally, displaying the implicit information.

The medium is non-transitory.

The invention claimed is:

1. A computer-implemented method for finding implicit information in written natural language sentences comprising the steps of:
   (a) a computer processor, linked to user, who types in a written text, sentence or sentences, with a request this written text to be analysed, sentence by sentence, in order to find implicit information in it; and
   (b) the computer processor reads the user's written sentence, understands its meaning by analysing successive and non-successive words, up to five words in a sequence, within the sentence or the clause; and
   (c) the computer processor finds logically entailed, new, novel, implicit information, which is not explicitly mentioned in the written sentence, neither contained in the synonyms of its constituent words, nor present in the concept(s) the words belong to; and
   (d) the computer based software application is a computer software process for analysing the text, sentence after sentence, and displaying the implicit information in written form, for each sentence, as a variant of this sentence.

2. An automated, intelligent, computer system having a database of coded information, comprising:
   (a) a computer processor linked to one or more users;
      wherein the computer processor can receive the user's written input; and
   (b) an automated intelligent system which is controlled by the computer processor,
   wherein the automated intelligent system has a machine program code,
   wherein the machine program code is executable to perform a reasoning process,
   wherein the reasoning process is tied to a database of words with coded information,
   wherein the coded information comprises part-of-speech information, including morphological, grammatical, syntactical and semantical information,
   wherein the reasoning process is tied to a built-in semantic representation of word meanings and their relationships,
   wherein the automated intelligent system analyses user's written input,
   wherein the automated intelligent system understands the grammatical and syntactical structure of user's written input and its meaning,
   wherein the automated intelligent system finds hidden, implicit, meaning in users's written input,
   wherein the automated intelligent system displays the implicit meaning,
   wherein the displayed implicit meaning can be used further by other, internal or external machines, for other tasks.

3. A non-transitory, tangible computer-readable medium on which are stored computer instructions which, when executed by a computer, cause the computer to perform the method of claim 1 via the system of claim 2.

* * * * *